No. 855,889.
PATENTED JUNE 4, 1907.
F. G. HUNTER.
GREASE CUP.
APPLICATION FILED JAN. 14, 1907.
3 SHEETS—SHEET 3.
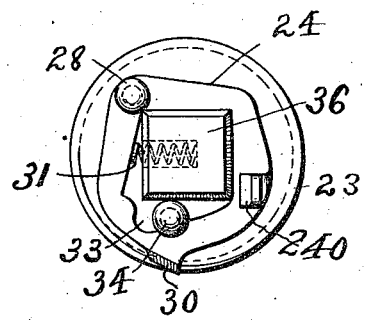
Fig. 10
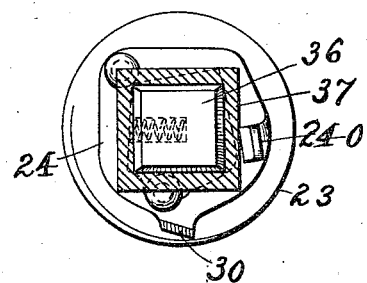
Fig. 11
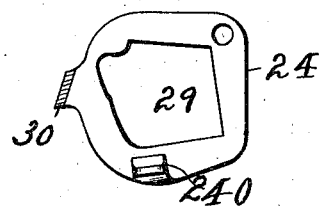
Fig. 12
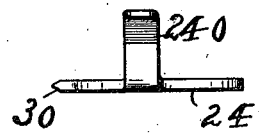
Fig. 13
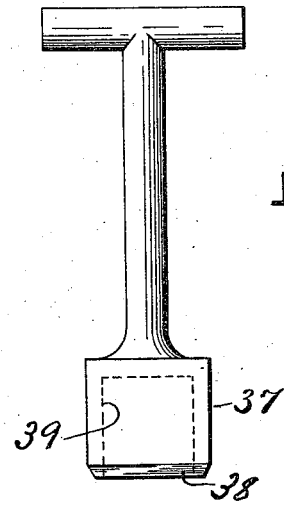
Fig. 14
Fig. 16
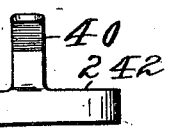
Fig. 17
Fig. 15
WITNESSES:
Geo. D. Richards
F. W. Frantzel
INVENTOR
Frederick George Hunter,
BY Chas. E. Gill
ATTORNEY

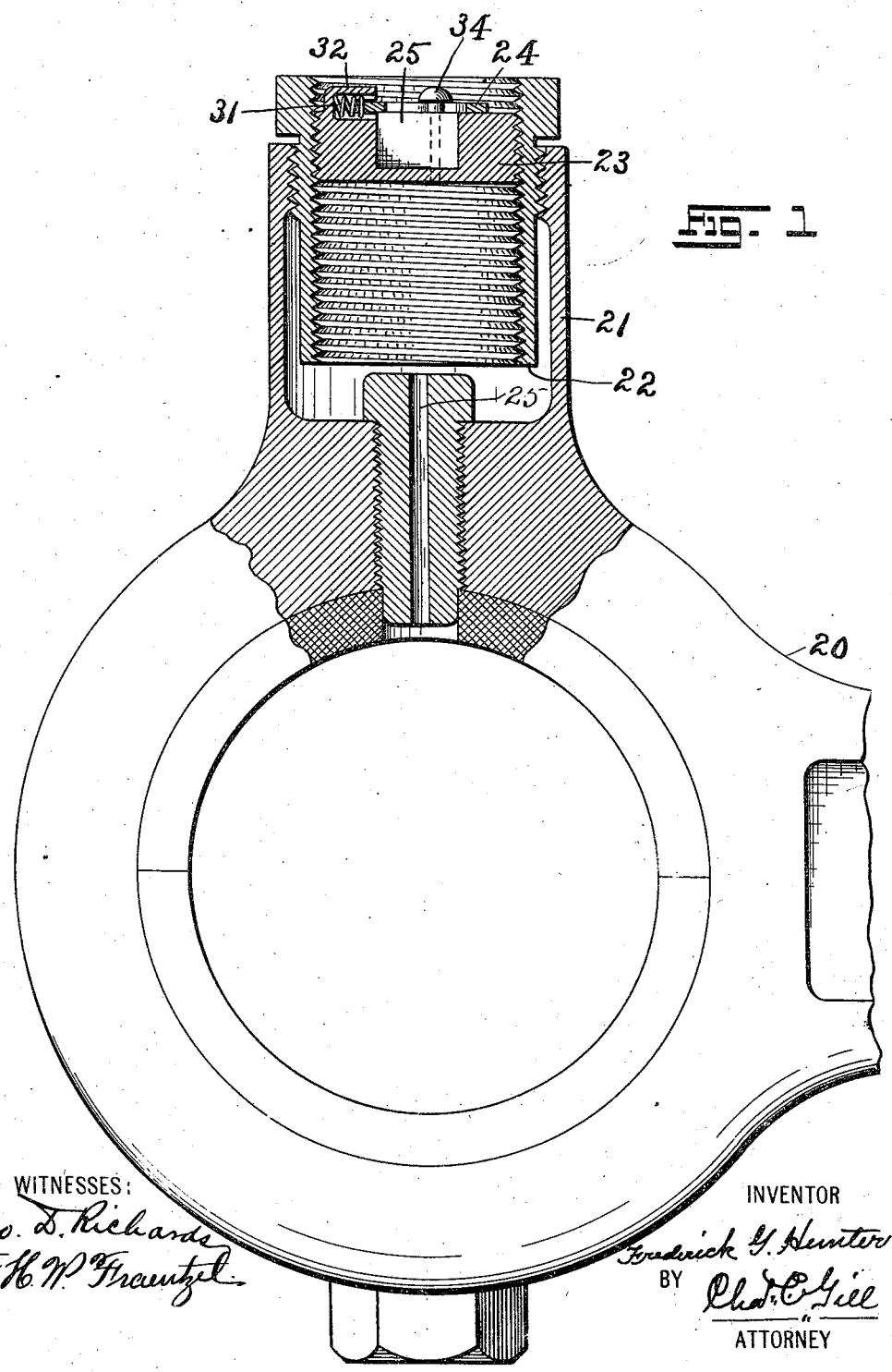

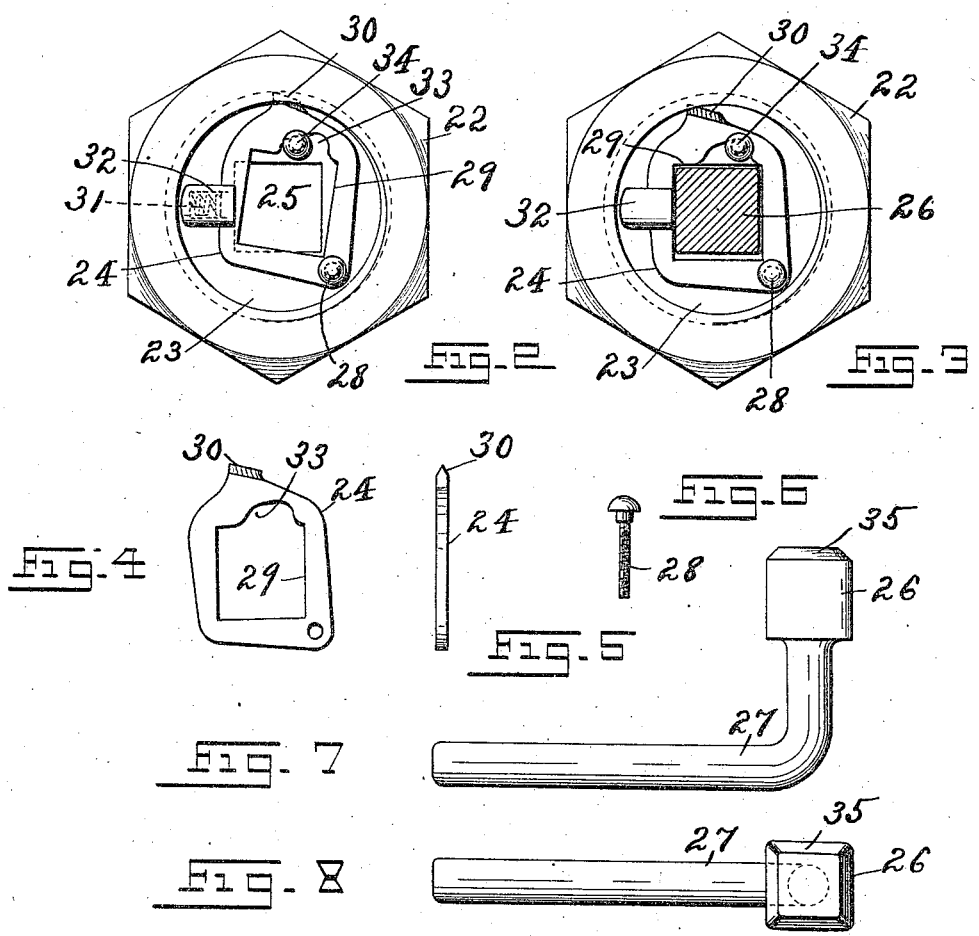

UNITED STATES PATENT OFFICE.

FREDERICK GEORGE HUNTER, OF MONCTON, NEW BRUNSWICK, CANADA.

GREASE-CUP.

No. 855,889.　　　Specification of Letters Patent.　　　Patented June 4, 1907.

Application filed January 14, 1907. Serial No. 352,138.

*To all whom it may concern:*

Be it known that I, FREDERICK GEORGE HUNTER, a citizen of the Dominion of Canada, residing at the city of Moncton, in the county of Westmoreland and Province of New Brunswick, Canada, have invented certain new and useful Improvements in Grease-Cups, of which the following is a specification.

The invention relates to improvements in grease-cups for use on locomotives, stationary engines and other machinery, and it consists in the novel features hereinafter described and particularly pointed out in the claims.

The purpose of the grease-cup is to afford convenient means for lubricating a bearing or the meeting surfaces of two parts which in use move against each other or have one surface moving against the other. A grease-cup is cylindrical in outline and at its lower end is in communication with a conduit or passage leading to the bearing or part to be lubricated and through which the grease is forced by pressure applied upon the top of the body of grease within the cup.

The grease-cup of my invention comprises a cylindrical casing having a female screw thread in its inner wall, a plug having a male thread on its sides adapted to engage said female thread, said plug being adapted to be screwed down upon the body of grease in the cup, and means, substantially as hereinafter described, for preventing said plug from working upwardly from the body of grease or from the cup due to the jarring of the same by the movement of the parts of the locomotive or other machinery to which the cup may be applied.

My invention relates more particularly to the plug which enters the cup and engages the top of the body of grease therein, and its object is to provide a plug having means for automatically preventing the outward movement of the same except when by the application of the proper key or tool said means are moved to an inoperative position preparatory to the removal of the plug.

The invention will be fully understood from the detailed description hereinafter presented, reference being had to the accompanying drawings, in which:

Figure 1 is a side elevation, partly broken away, of one of the side rods of a locomotive engine equipped with a grease-cup embodying my invention, the cup and its plug being shown in central vertical section; Fig. 2 is a detached top view of the cup with the plug locked therein by means embracing my invention; Fig. 3 is a like view of same, with the plug locking means shown as held in an inoperative position by the key or tool used for unscrewing or removing the plug, said key being shown in transverse section; Fig. 4 is a detached top view of the locking-plate removed from the top of the plug; Fig. 5 is an edge view of same; Fig. 6 is a detached side view of the pin for pivotally securing the locking-plate upon the plug; Fig. 7 is a side elevation of the key or tool for screwing the plug into and removing it from the cup, the engaging end of said tool being also adapted when applied to the plug to move the locking plate into and hold it at its inoperative position; Fig. 8 is an elevation of same, taken from the top of Fig. 7; Fig. 9 is a side elevation of a modified form of plug embodying my invention, the modification residing mainly in providing the plug with a vertical polygonal stem in lieu of a socket to receive an applying and removing key or tool, and equipping the locking-plate with an upwardly extending lip to be engaged by the side of said key or tool when the latter is applied to said stem, for moving the said plate into its inoperative position; Fig. 10 is a top view of the plug shown in Fig. 9; Fig. 11 is a like view of same, with the locking-plate shown held in its inoperative position by the key applied to the polygonal stem of the plug, said key being shown in transverse section; Fig. 12 is a detached top view of the locking-plate of the plug shown in Figs. 9, 10 and 11; Fig. 13 is a side view of same; Fig. 14 is a side elevation of a key or tool adapted for applying and removing the plug shown in Figs. 9, 10 and 11, this key having a socket in its lower end to fit over the polygonal stem of the plug; Fig. 15 is a view of the lower end of same; Fig. 16 is an edge view of a modified form of the locking-plate shown in Figs. 1 to 5 inclusive, the modification residing in providing the engaging end or point of the plate with several teeth instead of only one tooth to lock against the inner threaded wall of the grease-cup, and Fig. 17 is a view of a like modification of the locking plate presented in Figs. 9 to 13 inclusive.

In the drawings, 20 designates a portion of one of the usual side rods of a locomotive engine, 21 an external grease-cup or shell formed on the end thereof, 22 an inner grease-cup secured within said external cup or shell, 23 a plug or plunger within the upper portion of said inner grease-cup, 24 the locking-plate pivoted thereon, and 25 the conduit or passage leading from the grease-cup to the parts to be lubricated.

My invention resides in an internally threaded cup, plug 23 and locking plate 24, and not in any special external construction of or means for securing the said cup, the means shown for this purpose presenting only one of several well known and commonly used methods for securing grease-cups, one other method being to form the external cup 21 as a separate piece and bolt it to the rod 20, in which instance the inner side walls of the cup are threaded from the top to nearly the bottom of the same and the threaded plug 23 is applied directly to said walls in lieu of to the walls of an inner cup 22, which in such instance is not used at all.

For the purposes of the present invention the inner cup 22 may be considered as simply forming the inner walls of the outer cup 21 but for convenience in describing the structure shown the said parts are referred to as inner and outer cups. The outer cup 21 is threaded at its upper inner portion to receive the exterior thread on the inner cup 22, as usual, and the inner cup 22 is formed on its inner walls with a female thread extending from the top to the bottom of the same, as shown in Fig. 1.

The plug or plunger 23 has an exterior thread adapted to the female thread on the cup 22 and (referring to Figs. 1 to 3 inclusive) said plug has formed in its upper central portion a cavity or recess 25 which is polygonal in cross section and adapted to receive the correspondingly shaped end 26 of a key or tool 27 by which said plug may be conveniently screwed down into the cup 22 or unscrewed upwardly therefrom.

Upon the plug 23 I pivotally secure, by means of a pin 28, the locking-plate 24, which, in the outline illustrated, is in the form of a flat frame having an opening 29 and a toothed projection 30, said opening 29 substantially corresponding with the outline of the recess 25, as denoted in Fig. 3, and said projection 30 being adapted when said opening 29 is not in line with said recess, or in the position shown in Fig. 2, to engage the inner wall of the cup 22 and lock the plug 23 within said cup. When the plate 24 is in the position shown in Fig. 3 with its opening 29 matching the recess 25, the projection 30 is free of the wall of the cup 22 and idle. The plate 24 is normally yieldingly held in the position shown in Fig. 2 with its opening not matching but on the contrary overlapping the recess 25, by means of a coiled spring 31 housed beneath a lip 32 and pressing against one edge of said plate. The lip 32 is integral with the plug 23 and is of sufficient length to extend over a part of the plate 24 and thereby serve to guide the plate and resist any strain tending to force the plate upwardly from the plug. At the edge of the opening 29 nearest the projection 30, the plate 24 is formed with an arc-like recess 33 which extends upon the face of the plug, and within the outline of said recess 33 a pin 34 is fastened to the plug with its head lapping upon the adjacent edge of the plate 24, as shown in Figs. 2 and 3, said head also serving to resist any strain tending to force the plate upwardly from the plug.

The projection 30 is pointed at its end and this pointed end projects toward the left or in a position to normally resist the unscrewing of the plug. The pointed end of the projection 30 enters in between the threads on the cup, and when the plate 24 is pressed laterally by the spring 31 (Fig. 2), said end is held eccentrically to the plug, thereby enabling the plate to absolutely prevent any accidental unscrewing of the plug. The plate 24 is hinged or pivotally secured at one corner, this being the lower right hand corner, looking at Figs. 2 and 3, and the projection 30 is located somewhat to the right of the diagonally opposite corner of the plate, thereby assuring for said projection a thoroughly effective eccentric position to resist, when in operation, the unscrewing of the plug.

When it is desired to apply the plug 23 to the cup (referring to Figs. 1, 2 and 3), the end 26 of the tool 27 is pressed through the opening 29 in the plate 24 and into the recess or socket 25 in the plug 23, the tapered edge 35 of said tool first engaging that portion (the left hand portion, looking at Fig. 2) of said plate overlapping said recess and moving said plate to the left until the opening 29 therein registers with said recess, whereupon the end of the tool may fully enter said recess, as shown in Fig. 3. The end of the tool 27 when in the recess of the plug holds the plate or lock 24 in its inoperative position (Fig. 3), and the pressure of said plate against the side of the end of the tool binds said plug to the tool, so that the plug may be carried on the end of the tool, which is an important consideration especially when the plug is hot or covered with grease, which is often the case. Upon the insertion of the end of the tool 27 in the recess of the plug, the latter may be readily screwed into the cup and down upon the body of grease, and from time to time if necessary the tool may be utilized for moving the plug farther down in the cup as the grease becomes consumed. After the plug has been introduced into the cup, the tool will be withdrawn therefrom, and thereupon the spring 31 will immediately move the plate 24 to its operative position, shown in Fig. 2, causing the projection 30 to engage the wall of the cup, in which position said plate will lock the plug against any action tending to cause it to work upwardly within or from the cup. When it is desired to remove the plug 23 from the cup the tool 27 will be applied to the same as before and used to unscrew the plug, the plate 24 then being held by the tool in its inoperative position shown in Fig. 3.

In Figs. 9 to 13 inclusive I illustrate the plug 23 as having a central vertical polygonal stem 36 in lieu of a recess or cavity 25 to receive the applying and removing tool, which in view of the use of the stem should be of the construction shown in Figs. 14 and 15, wherein it will be seen that the end 37 of the tool is formed with a tapered edge 38 (corresponding with the tapered edge 35 of the tool 27) and a socket 39 to pass upon the stem 36. The plate 240 for the plug shown in Figs. 9 to 13 inclusive is provided at one side with an upwardly and inwardly and then outwardly extending lip 40 (Fig. 9) to be engaged by the side of the end 37 of the tool when the latter is applied to the stem 36, so that thereby said plate may be moved to its inoperative position, shown in Fig. 11. Upon the removal of the tool from the stem 36 the spring 31 will restore the plate 240 to its operative position. The spring 31 in the construction shown in Figs. 9, 10 and 11 is set into a recess formed in the side of the stem 36 and presses against the inner edge of one side of the plate 240 instead of against the outer edge of the other side thereof, as in the construction shown in Figs. 2 and 3. In the construction shown in Figs. 9, 10 and 11, the integral lip 32 of Figs. 2 and 3 is omitted and the arc-like recess 33 and pin 34 are employed.

I present Figs. 9, 10 and 11 to indicate that the invention is not limited to all the details shown in Figs. 1, 2 and 3, and that the details of construction may be readily modified within the spirit of my invention and without departing from the scope thereof.

In Fig. 16 I present the locking-plate of Figs. 1, 2 and 3 as being somewhat thickened and provided with several teeth to engage the inner wall of the cup, this modified form of locking-plate numbered 241 and in Fig. 17 I show the locking-plate of Figs. 9, 10 and 11 as being thickened and provided with several engaging-teeth this modified form of locking plate being numbered 242.

I have hereinbefore described the preferred embodiments of my invention and I am aware of further modifications which do not require specific mention.

Without therefore limiting my invention to details of form or construction further than the same may be indicated in the claims, what I claim as new and desire to secure by Letters-Patent, is:

1. A grease-cup having a female thread on its inner cylindrical wall, a screw plug to enter the cup and engage said thread and provided with means for receiving a tool to operate it, and a spring-pressed locking piece carried by the plug and having a projecting portion normally engaging the wall of the cup for locking said plug against movement therefrom, said locking piece having a part to be engaged by said tool for moving said piece to its inoperative position: substantially as set forth.

2. A grease-cup having a female thread on its inner cylindrical wall, a screw plug to enter the cup and engage said thread and provided with means for receiving a tool to operate it, and a spring-pressed locking piece carried by the plug and having an eccentrically disposed projecting portion normally engaging the wall of the cup for locking said plug against movement therefrom, said locking piece having a part to be engaged by said tool for moving said piece to its inoperative position; substantially as set forth.

3. A grease-cup having a female thread on its inner cylindrical wall, a screw plug to enter the cup and engage said thread and provided with means for receiving a tool to operate it, and a spring-pressed locking piece pivotally secured to said plug and having an eccentrically disposed projecting portion normally engaging the wall of the cup for locking said plug against movement therefrom, said locking piece having a part to be engaged by said tool for moving said piece to its inoperative position; substantially as set forth.

4. A grease-cup having a female thread on its inner cylindrical wall, a screw-plug to enter the cup and engage said thread and having polygonally shaped means for receiving a tool to operate it, and an eccentrically mounted spring-pressed locking-piece carried by the plug and having a projecting portion normally engaging the wall of the cup for locking the plug against movement therefrom, said locking-piece being in the form of an open frame and normally obstructing the application of the said tool to the plug and being adapted to be moved to its inoperative position by the act of applying the tool to the plug; substantially as set forth.

5. A grease cup having a female thread on its inner cylindrical wall, a screw-plug to enter the cup and engage said thread and having a socket to receive a tool for operating it, and an eccentrically mounted spring-pressed locking-piece carried by the plug and having a projecting portion normally engaging the wall of the cup for locking the plug against movement therefrom, said locking-piece being in the form of an open frame and normally obstructing the application of the said tool to the plug and being adapted to be moved to its inoperative position by the act of applying the tool to the plug; substantially as set forth.

6. A grease-cup having a female thread on its inner cylindrical wall, a screw-plug to enter the cup and engage said thread, and a spring-pressed locking piece carried by the plug and having a projecting portion normally engaging the wall of the cup for locking the plug against movement therefrom; said locking-piece being an eccentric and by reason thereof normally positively preventing any reverse movement of said plug; substantially as set forth.

7. A grease-cup having a female thread on its inner cylindrical wall, a screw-plug to enter the cup and engage said thread, and an eccentrically mounted spring-pressed locking piece carried by the plug and having a projecting portion normally engaging the wall of the cup for locking the plug against movement therefrom, said plug having a lip extending over a part of said locking-piece in position to resist upward strains against the same; substantially as set forth.

8. A grease-cup having a female thread on its inner cylindrical wall, a screw-plug to enter the cup and engage said thread, and an eccentrically mounted spring-pressed locking piece carried by the plug and having a projecting portion normally engaging the wall of the cup for locking the plug against movement therefrom, said locking-piece having an elongated recess (33) near said projecting portion and said plug having a pin (34) within the outline of said recess and whose head extends partly over said piece; substantially as set forth.

9. A grease-cup having a female thread on its inner cylindrical wall, a screw-plug to enter the cup and engage said thread, and a spring-pressed locking plate pivotally secured at one point to said plug and at a diagonal point having a tooth to engage the wall of the cup for locking the plug against movement therefrom; substantially as set forth.

10. A grease-cup having a female thread on its inner cylindrical wall, a screw-plug to enter the cup and engage said thread, and a spring-pressed locking plate pivotally secured at one point to said plug and at a diagonal point having a tooth to engage the wall of the cup for locking the plug against movement therefrom, said plug having a seat for an operating tool and said plate normally obstructing the application of the tool to said seat but adapted to yield to the pressure of said tool; substantially as set forth.

Signed at Moncton, Westmorland county, New Brunswick, Canada, this 7th day of January 1907.

FREDERICK GEORGE HUNTER.

Witnesses:
AUSTIN A. ALLEN,
GEO. HARRY HUNTER.